United States Patent
Shi et al.

(10) Patent No.: US 12,048,047 B2
(45) Date of Patent: Jul. 23, 2024

(54) RECEPTION CONFIGURATION METHOD AND APPARATUS, RECEPTION CONTROL METHOD AND APPARATUS, TERMINAL, BASE STATION, AND STORAGE MEDIUM

(71) Applicant: ZTE CORPORATION, Guangdong (CN)

(72) Inventors: Jing Shi, Guangdong (CN); Peng Hao, Guangdong (CN); Yachao Liang, Guangdong (CN); Xingguang Wei, Guangdong (CN); Xianghui Han, Guangdong (CN)

(73) Assignee: ZTE Corporation, Shenzhen (CN)

( * ) Notice: Subject to any disclaimer, the term of this patent is extended or adjusted under 35 U.S.C. 154(b) by 517 days.

(21) Appl. No.: 17/266,865

(22) PCT Filed: Aug. 12, 2019

(86) PCT No.: PCT/CN2019/100183
§ 371 (c)(1),
(2) Date: Feb. 8, 2021

(87) PCT Pub. No.: WO2020/030175
PCT Pub. Date: Feb. 13, 2020

(65) Prior Publication Data
US 2021/0298115 A1 Sep. 23, 2021

(30) Foreign Application Priority Data
Aug. 10, 2018 (CN) .................. 201810912159.9

(51) Int. Cl.
*H04W 76/28* (2018.01)
*H04W 52/02* (2009.01)
*H04W 72/23* (2023.01)

(52) U.S. Cl.
CPC ....... *H04W 76/28* (2018.02); *H04W 52/0229* (2013.01); *H04W 52/0274* (2013.01); *H04W 72/23* (2023.01)

(58) Field of Classification Search
CPC . H04W 76/28; H04W 72/23; H04W 52/0229; H04W 52/0274
See application file for complete search history.

(56) References Cited

U.S. PATENT DOCUMENTS 9,872,252 B1   1/2018   Ang et al.
10,085,203 B2  9/2018   Xue et al.
(Continued)

FOREIGN PATENT DOCUMENTS

CA   3049700 A1   7/2018
CN   102655668 A  9/2012
(Continued)

OTHER PUBLICATIONS

Office Action for KR Appl. No. 10-2021-7007328 dated Dec. 27, 2022 (with English translation, 10 pages).
Qualcomm Incorporated, "UE Power Saving during Active State," 3GPP TSG RAN WG2 NR #99, R2-1709117, Aug. 21-25, 2017, Berlin, Germany (6 pages).
Extended European Search Report for EP Appl. No. 19846904.1, dated Mar. 11, 2022 (14 pages).
Qualcomm Incorporated, "Advanced Grant Indication for UE Power Saving" 3GPP TSG RAN WG1 #91, R1-1720709, Dec. 1, 2017, Reno, USA (5 pages).
(Continued)

*Primary Examiner* — Justin Y Lee
(74) *Attorney, Agent, or Firm* — Foley & Lardner LLP (57) ABSTRACT

Provided are a reception configuration method and apparatus, a reception control method and apparatus, a terminal, a base station and a storage medium. The reception configuration includes: determining a detection result of indication information within a first time length in a DRX cycle, where the DRX cycle includes an on duration and an off duration; and determining a DRX operation according to the detection result.

8 Claims, 4 Drawing Sheets

(56) References Cited

U.S. PATENT DOCUMENTS

| | | | |
|---|---|---|---|
| 10,602,442 | B2 | 3/2020 | Rune et al. |
| 2015/0282208 | A1 | 10/2015 | Yi et al. |
| 2016/0269996 | A1 | 9/2016 | Wu et al. |
| 2017/0339641 | A1 | 11/2017 | Nigam et al. |
| 2019/0254110 | A1* | 8/2019 | He .................. H04L 5/0048 |
| 2021/0022075 | A1* | 1/2021 | Xu .................. H04W 56/001 |

FOREIGN PATENT DOCUMENTS

| | | |
|---|---|---|
| CN | 102932884 A | 2/2013 |
| CN | 103582087 | 2/2014 |
| CN | 103906123 | 7/2014 |
| CN | 104205993 A | 12/2014 |
| CN | 104219740 A | 12/2014 |
| CN | 105009661 A | 10/2015 |
| CN | 106465451 A | 2/2017 |
| CN | 108235412 A | 6/2018 |
| CN | 108307406 | 7/2018 |
| CN | 108307406 B | 7/2018 |
| CN | 108307547 | 7/2018 |
| JP | 2021-521670 A | 8/2021 |
| KR | 10-2009-0121323 A | 11/2009 |
| KR | 10-2017-0003629 A | 1/2017 |
| RU | 2645757 C2 | 2/2018 |
| WO | WO-2012/149319 A1 | 11/2012 |
| WO | WO-2013/035984 A1 | 3/2013 |
| WO | WO-2016/146147 A1 | 9/2016 |
| WO | 2016161708 | 10/2016 |
| WO | WO-2018/066923 A1 | 4/2018 |
| WO | WO-2018/136521 A1 | 7/2018 |
| WO | WO-2019/196038 A1 | 10/2019 |

OTHER PUBLICATIONS

Qualcomm Incorporated, "Efficient monitoring of DL controls channels" 3GPP TSG RAN WG1 Meeting #91, R1-1720417, Dec. 1, 2017, Reno, USA (11 pages).

Samsung, "DL power consumption reduction for eMTC" 3GPP TSG RAN WG1 Meeting #90, R1-1713542, Aug. 25, 2017, Prague, Czechia (5 pages).

Patent Cooperation Treaty (PCT), International Search Report and Written Opinion for Application PCT/CN2019/100183 filed on Aug. 12, 2019, dated Oct. 23, 2019, International Searching Authority, CN.

First Office Action for CN Appl. No. 201810912159.9, dated Oct. 25, 2021 (with English translation, 18 pages).

Qualcomm Incorporated et al.: "Wake-Up Signaling for C-DRX Mode" 3GPP TSG RAN WG2 NR #99; R2-1709652; Aug. 25, 2017; Berlin, Germany (5 pages).

Qualcomm Incorporated: "UE Power Evaluation for DRX with Wake-Up Signaling" 3GPP TSG-RAN WG1 #87; R1-1612068; Nov. 18, 2016; Reno, USA (7 pages).

Catt et al., "New SID: Study on UE Power Saving in NR" 3GPP TSG RAN Meetings #80, RP-180923, Jun. 14, 2018, La Jolla, USA (5 pages).

International Search Report and Written Opinion for PCT Appl. No. PCT/CN2019/100148, dated Nov. 12, 2019 (with English translation, 11 pages).

Ericsson, "DRX with short on-duration and Wake-up signaling," 3GPP TSG-RAN WG2 #98-AH; Tdoc R2-1707124, Update of R2-1704402; Jun. 27-29, 2017; Qingdao, P.R. of China (3 pages).

Notice of Allowance for KR App. No. 10-2021-7007328 dated Jan. 17, 2024 (with English translation, 8 pages).

* cited by examiner

RECEPTION CONFIGURATION METHOD AND APPARATUS, RECEPTION CONTROL METHOD AND APPARATUS, TERMINAL, BASE STATION, AND STORAGE MEDIUM

This application is a U.S. National Stage Application, filed under 35 U.S.C. 371, of International Patent Application No. PCT/CN2019/100183, filed on Aug. 12, 2019, which claims priority to Chinese Patent Application No. 201810912159.9 filed with the CNIPA on Aug. 10, 2018, the disclosure of which is incorporated herein by reference in their entireties.

TECHNICAL FIELD

The present application relates to the field of communications and, in particular, to a reception configuration method and apparatus, a reception control method and apparatus, a terminal, a base station and a storage medium.

BACKGROUND

The 4th generation (4G) mobile communication technology, long-term evolution (LTE), long-term evolution advance (LTE-Advance) and the 5th generation (5G) mobile communication technology are facing increasing requirements. From the development trend, both the 4G system and the 5G system are studying features of supporting enhanced mobile broadband, ultra-high reliability, ultra-low latency transmission and massive connectivity.

However, while supporting these features, a terminal also has increasing energy consumption. To solve the energy consumption problem, it is necessary to further optimize the dormancy problem of the terminal. In the 5G system, an existing dormancy mechanism of the terminal is discontinuous reception (DRX). However, for the DRX, the terminal still needs to wake up at configured cycle times and perform PDCCH blind detections for a period of time, resulting in energy consumption. Meanwhile, there is no explicit restriction on reception of public messages during sleep, so it is necessary to further optimize the DRX mechanism.

SUMMARY

Embodiments of the present disclosure provide a reception configuration method and apparatus, a reception control method and apparatus, a terminal, a base station and a storage medium. These solve the problem that a terminal still needs to wake up at cyclic times configured for DRX and perform PDCCH blind detections, resulting in energy consumption, and meanwhile, there is no explicit restriction on reception of public messages during sleep, limiting the DRX performance in the related art.

An embodiment of the present disclosure provides a reception configuration method. The method includes the steps described below.

A detection result of indication information within a first time length in a DRX cycle is determined.

A DRX operation is determined according to the detection result. The DRX cycle includes an on duration and an off duration.

An embodiment of the present disclosure further provides a reception control method. The method includes the steps described below.

Indication information is sent to a terminal. The sending situation of the indication information is used for instructing the terminal to determine a DRX operation.

Response information sent by the terminal after the terminal detects the indication information within a first time length in a DRX cycle is received. The DRX cycle includes an on duration and an off duration.

An embodiment of the present disclosure further provides a reception configuration apparatus. The apparatus includes a strategy determination module.

The strategy determination module is configured to determine a detection result of indication information within a first time length in a DRX cycle, and determine a DRX operation according to the detection result. The DRX cycle includes an on duration and an off duration.

An embodiment of the present disclosure further provides a reception control apparatus. The apparatus includes a sending module and a reception module.

The sending module is configured to send indication information to a terminal. The sending situation of the indication information is used for instructing the terminal to determine a DRX operation.

The reception module is configured to receive response information sent by the terminal after the terminal detects the indication information within a first time length in a DRX cycle. The DRX cycle includes an on duration and an off duration.

An embodiment of the present disclosure provides a terminal. The terminal includes a first processor, a first memory and a first communication bus.

The first communication bus is configured to implement connection and communication between the first processor and the first memory.

The processor is configured to execute one or more programs stored in the memory, so as to perform the steps of any reception configuration method above.

An embodiment of the present disclosure further provides a base station. The base station includes a second processor, a second memory and a second communication bus.

The second communication bus is configured to implement connection and communication between the second processor and the second memory.

The second processor is configured to execute one or more programs stored in the second memory, so as to perform the steps of any reception control method above.

An embodiment of the present disclosure further provides a computer-readable storage medium. The computer-readable storage medium stores one or more programs executable by one or more processors, so to perform the steps of any reception configuration method above or the steps of any reception control method above.

The embodiments of the present disclosure provide a reception configuration method and apparatus, a reception control method and apparatus, a terminal, a base station and a storage medium. A detection result of indication information within a first time length in a DRX cycle is determined. The DRX cycle includes an on duration and an off duration. A DRX operation to be executed is determined according to the detection result. DRX configuration is performed according to the DRX operation. In the case of introducing the indication information, DRX is configured by detecting the indication information, thereby optimizing the DRX performance.

DETAILED DESCRIPTION

Figure 1:
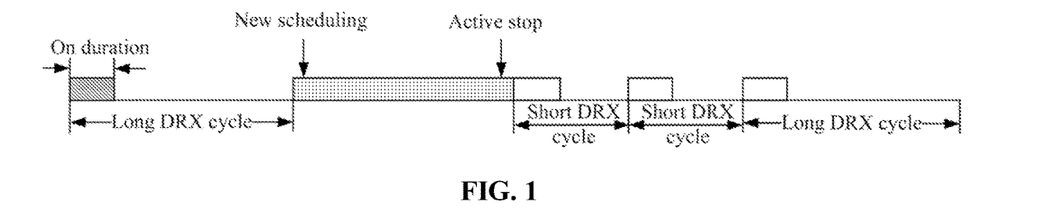
FIG. 1 is a schematic diagram of a DRX configuration in the related art.

As shown in FIG. 1, in the related art, a DRX mechanism is introduced into an LTE system to reduce energy consumption of a terminal. That is, when the terminal is in a connected state, it is not necessary to continuously monitor a control channel of a base station, and instead, the control channel is intermittently monitored. An on duration refers to a time period in which the terminal monitors the control channel. Other time excluding the on duration are off durations in which the terminal is in a dormancy state and a radio frequency link of the terminal is closed. The terminal wakes up in an on duration at the start of a configured DRX cycle and performs continuous PDCCH detections, while performs no PDCCH detections in an off duration. The DRX cycle may include a long DRX cycle or a short DRX cycle. Compared with in the long DRX cycle, on durations occur more frequently in the short DRX cycle. The UE is awakened after detecting a PDCCH dedicated to the terminal. If the physical downlink control channel (PDCCH) dedicated to the terminal is not detected and a DRX-on duration timer also expires, the terminal maintains in the dormancy state. Alternatively, if the PDCCH dedicated to the terminal is detected and a DRX-inactivity timer is started/restarted, then the terminal maintains the dormancy state when the DRX-inactivity timer expires or the terminal receives a DRX command or a medium access control (MAC) control element (CE).

Since the terminal still needs to wake up at cyclic times configured for DRX and perform PDCCH blind detections for a period of time, and meanwhile, there is no explicit restriction on reception of public messages during sleep, a DRX mechanism enhancement method is urgently needed to further improve the dormancy of the terminal.

Embodiments of the present disclosure are further described below in detail in conjunction with the drawings and specific implementations. It is to be understood that the embodiments described herein are merely intended to explain the present application and not to limit the present application.

First Embodiment

Figure 2:
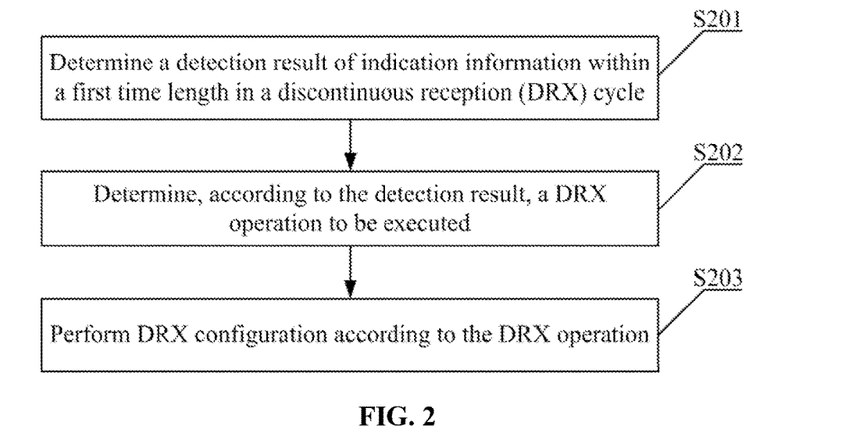
FIG. 2 is a flowchart of a reception configuration method according to a first embodiment of the present application.

In the related art, a terminal still needs to wake up at cyclic times configured for DRX and performs PDCCH blind detections, resulting energy consumption, and meanwhile, there is no explicit restriction on reception of public messages during sleep, limiting the DRX performance. To solve the preceding problem, this embodiment provides a discontinuous reception (DRX) configuration method. Referring to FIG. 2, it shows a flowchart of a reception configuration method.

In step S201, a detection result of indication information within a first time length in a discontinuous reception (DRX) cycle is determined.

In this embodiment, the indication information may be physical layer indication information. The terminal may switch between a DRX wake up state and a DRX dormancy state. The DRX wake up state refers to performing continuous PDCCH blind detections in an on duration. The DRX dormancy state refers to performing discontinuous PDCCH blind detections in an off duration, or receiving no signals or no channels other than the indication information.

In this embodiment, the indication information includes a state switch channel or a state switch signal. When the state switch channel or the state switch signal is a unidirectional state switch channel or a unidirectional state switch signal, where one form may be a wake up signal and/or a wake up channel (PDCCH) (WUS/WUP), the state switch channel or the state switch signal may be used for indicating a switch to a wake up state. When the state switch channel or the state switch signal is a unidirectional/bidirectional state switch channel or a unidirectional/bidirectional state switch signal, where one form may be L1 signaling including an L1 signal and/or an L1 channel, the state switch channel or the state switch signal has at least the function of indicating a switch to a dormancy state (go to sleep). In this embodiment, the DRX cycle consists of the on duration and the off duration. It is to be noted that in this embodiment, the first time length is a detection time length of the indication information. The first time length may be selectively set in any one of the on duration or the off duration of the DRX cycle, or may be set in both the on duration and the off duration. In addition, it is to be understood that in this embodiment, the detection result of the indication information detection is used for indicating whether the terminal receives the indication information.

In step S202, a DRX operation to be executed is determined according to the detection result.

It is to be noted that in this embodiment, the corresponding DRX operation is triggered according to whether the indication information is received, so as to enhance the DRX performance.

In step S203, DRX configuration is performed according to the DRX operation.

In some examples of this embodiment, the DRX operation includes at least one of: a DRX wake up state operation of the on duration, a DRX dormancy state operation of the off duration, or an operation of dynamically switching from the DRX wake up state to the DRX dormancy state.

In this embodiment, when the DRX operation is the DRX wake up state operation of the on duration, the DRX wake up state operation of the on duration includes at least one of the following: performing PDCCH detections in an on duration of the current DRX cycle or on durations of N DRX cycles after the current DRX cycle, or continuing maintaining the dormancy state in an on duration of the current DRX cycle or on durations of N DRX cycles after the current DRX cycle, where N is an integer greater than or equal to 1.

Figure 3:
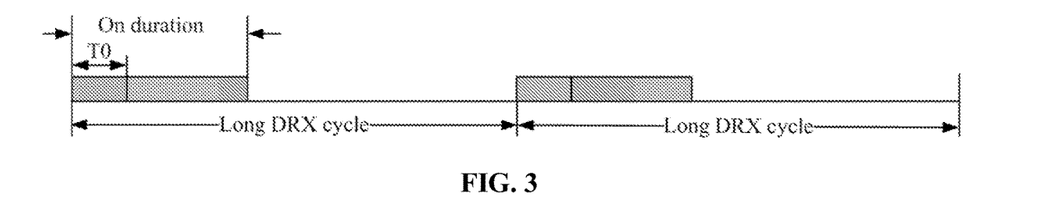
FIG. 3 is a schematic diagram of a first DRX configuration according to the first embodiment of the present application.

In some examples of this embodiment, the first time length is set in the on duration of the DRX cycle. The length of the first time length is configured through high layer signaling. A starting time of the first time length is the same as a starting time of the DRX cycle. First indication information includes wake up state indication information used for instructing the terminal to switch to the wake up state, which may be a wake up signal and/or a wake up channel. Then, the step in which the DRX operation to be executed is determined according to the detection result includes that: when the detection result is that the wake up signal and/or the wake up channel is detected, it is determined that the DRX operation to be executed is performing the PDCCH detections of the on duration of the current DRX cycle or the on durations of the N DRX cycles after the current DRX; and when the detection result is that the wake up signal and/or the wake up channel is not detected, it is determined that the DRX operation to be executed is continuing maintaining the dormancy state in the on duration of the current DRX cycle or the on durations of the N DRX cycles after the current DRX cycle. Specifically, referring to FIG. 3, a DRX cycle in FIG. 3 is a long DRX cycle, where T0 denotes a first time length. Only when a WUS/WUP is detected within T0 can PDCCH detections be performed in on durations. Otherwise, a dormancy state is continuously maintained. It is to be noted that the first time length may be less than or equal to the time length of an on duration.

It is to be noted that, still referring to FIG. 3, as an example in this embodiment, a configuration cycle of the first indication information such as the wake up signal and/or the wake up channel is the same as the DRX cycle. That is, a time interval between same reference times of every two T0s is the same as a time interval between same reference times of every two DRX cycles. Certainly, in some other embodiments, the configuration cycle of the first indication information may be greater than or less than the DRX cycle, which may be flexibly set according to specific application scenarios.

Moreover, in this embodiment, when configuring T0, some parameters of the DRX configuration, such as a cycle and an offset, may be shared, and only some parameters need to be additionally configured.

It is further to be noted that in this embodiment, the first time length may include at least one of: a time length required for transmitting the first indication information, a time length required for switching from the dormancy state to the wake up state, or a response feedback time length of the first indication information.

Additionally, in some examples of this embodiment, when the DRX operation is the DRX wake up state operation of the on duration, the DRX wake up state operation of the on duration includes at least one of the following: maintaining the dormancy state in an on duration of subsequent at least one DRX cycle, or performing PDCCH detections in an on duration of subsequent at least one DRX cycle.

Figure 4:
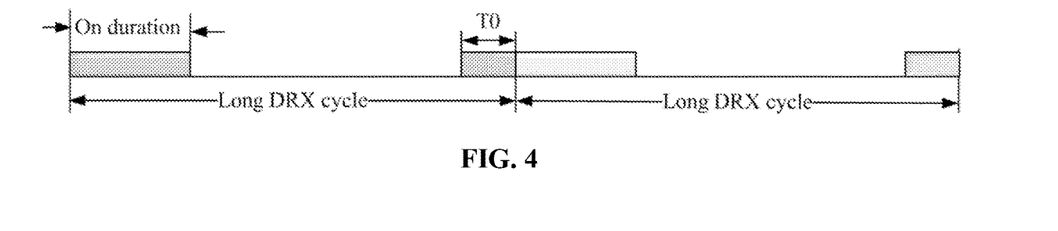
FIG. 4 is a schematic diagram of a second DRX configuration according to the first embodiment of the present application.

In some examples of this embodiment, the first time length is set in the off duration of the DRX cycle. The length of the first time length is configured through high layer signaling. The first time length is less than or equal to the time length of the off duration. The first indication information includes wake up state indication information for indicating a switch to the wake up state, which may be, for example, a wake up signal and/or a wake up channel. Then, the step in which the DRX operation to be executed is determined according to the detection result includes that: when the detection result is that the wake up signal and/or the wake up channel is detected, it is determined that the DRX operation to be executed is performing PDCCH detections of the on duration of the subsequent at least one DRX cycle; and when the detection result is that the wake up signal and/or the wake up channel is not detected, it is determined that the DRX operation to be executed is continuing maintaining the dormancy state in the on duration of the subsequent at least one DRX cycle. Specifically, referring to FIG. 4, a DRX cycle in FIG. 4 is a long DRX cycle, where T0 denotes a first time length. Only when a WUS/WUP is detected within T0 can PDCCH detections be performed in an on duration of a next DRX cycle. Otherwise, a dormancy state is continuously maintained. It is to be noted that a configuration cycle of the first indication information may be the same as the DRX cycle, and a starting time of the first time length where the first indication information is located may be determined according to a preset offset value. It is to be understood that in this embodiment, the offset value may be determined as a length difference between the DRX cycle and the first time length. That is, an end time of the first time length is the same as a starting time of the next DRX cycle. Certainly, in other embodiments, a certain time interval may be set between the end time of the first time length and the starting time of the next DRX cycle.

Additionally, in this embodiment, the first indication information may be configured independently of the DRX cycle. That is, T0 and the DRX cycle are two sets of configurations independent of each other. Different from that in FIG. 4, in this embodiment, there is a certain time interval between an end time of T0 and the starting time of the next DRX cycle, and in the case where the configuration cycle of the first indication information is less than the DRX cycle, there may be multiple T0s in one DRX cycle, thereby increasing setting density of T0s.

Figure 5:
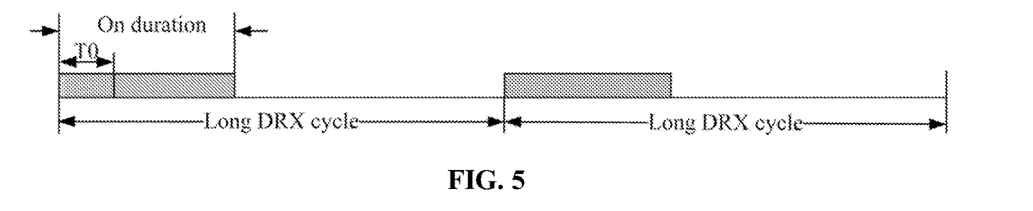
FIG. 5 is a schematic diagram of a third DRX configuration according to the first embodiment of the present application.

Additionally, as shown in FIGS. 3 and 4, each WUS/WUP transmitted in T0 corresponds to a wake up of a respective DRX cycle. Certainly, as shown in FIG. 5, each WUS/WUP may correspond to wake ups of subsequent N DRX cycles, i.e., indicating whether a terminal needs to perform PDCCH detections in on durations of subsequent X DRX cycles, where X is a preset value or a configured value or a dynamically indicated value. X shown in FIG. 5 is 2.

It is to be noted that in some examples of this embodiment, the starting time of the first time length and the end time of the first time length are located in different DRX cycles. That is, the first time length for indicating information is in both an off duration of the current DRX cycle and an on duration of the next DRX cycle. Thus, the starting time of the first time length is in the off duration of the current DRX cycle, then the first time length lasts to the on duration of the next DRX cycle, and the end time of the first time length is set in the on duration of the next DRX cycle. The length of the first time length is configured through high layer signaling. In this case, the first indication information has the wake up state indication information. Then, the step in which the DRX operation to be executed is determined according to the detection result includes that: when the detection result is that the first indication information such as a wake up signal and/or a wake up channel is detected in a discontinuous detection duration of the current DRX cycle, it is determined that the DRX operation to be executed is performing PDCCH detections in an on duration of subsequent at least one DRX cycle; and when the detection result is that the wake up signal and/or the wake up channel is not detected, it is determined that the DRX operation to be executed is continuing maintaining the dormancy state in the on duration of the subsequent at least one DRX cycle. When the detection result is that the first indication information such as a wake up signal and/or a wake up channel is detected in a continuous detection duration of the next DRX cycle, it is determined that the DRX operation to be executed is performing PDCCH detections in an on duration of subsequent at least one DRX cycle; and when the detection result is that the wake up signal and/or the wake up channel is not detected, it is determined that the DRX operation to be executed is continuing maintaining the dormancy state in the on duration of the subsequent at least one DRX cycle.

Figure 6:
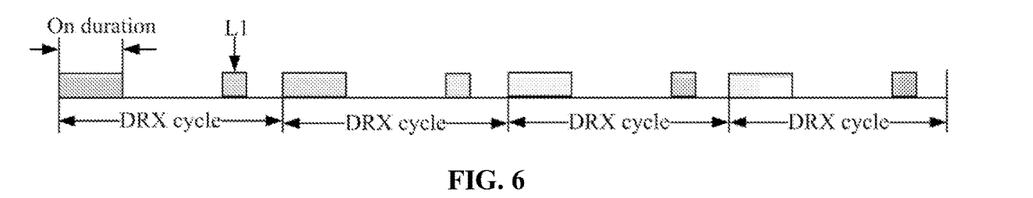
FIG. 6 is a schematic diagram of a fourth DRX configuration according to the first embodiment of the present application.

In some examples of this embodiment, the first time length is set in the off duration of the DRX cycle. The first time length is less than or equal to the time length of the off duration. Second indication information includes dormancy state indication information used for instructing the terminal to switch to the dormancy state, which may be, for example, L1 signaling including an L1 signal and/or an L1 channel. Then, the step in which the DRX operation to be executed is determined according to the detection result includes that: when the detection result is that the L1 signaling instructing the terminal to switch to the dormancy state is detected, it is determined that the DRX operation to be executed is continuing maintaining the dormancy state in the on duration of the subsequent at least one DRX cycle; and when the detection result is that the L1 signaling is not detected, it is determined that the DRX operation to be executed is performing the PDCCH detections in the on duration of the subsequent at least one DRX cycle. Specifically, referring to FIG. 6, a DRX cycle in FIG. 6 is a long DRX cycle, where the position indicated by L1 denotes a first time length. Only when L1 signaling instructing a terminal to switch to a dormancy state is detected within an information detection time length is it indicated that the terminal enters the dormancy state, and the dormancy state is maintained without PDCCH blind detections until the next L1 detection.

Figure 7:
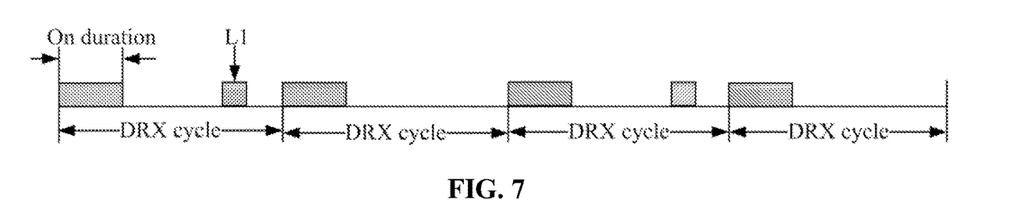
FIG. 7 is a schematic diagram of a fifth DRX configuration according to the first embodiment of the present application.
Figure 8:
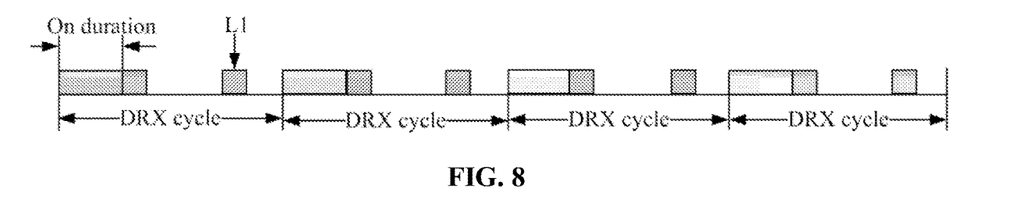
FIG. 8 is a schematic diagram of a sixth DRX configuration according to the first embodiment of the present application.

It is to be noted that FIG. 6 illustrates the case where the detection time length of the L1 signaling is equal to the DRX cycle. In this case, different offset values are configured for the detection time length, or the values of a gap with respect to a starting time of the next DRX cycle is configured for the detection time length. The gap value is greater than or equal to 0. In this case, before each DRX cycle starts, there is only one respective L1 signal and/or only one respective L1 channel. In other embodiments, as shown in FIG. 7, a detection time length of L1 signaling may be set to be greater than a DRX cycle; and as shown in FIG. 8, a detection time length of L1 signaling may be set to be less than a DRX cycle.

In an example of this embodiment, when a configuration cycle of the second indication information including the dormancy state indication information is less than the DRX cycle, after detection results of indication information within multiple first time lengths set in the DRX cycle are determined, the DRX operation to be executed is determined according to the last detection result. Specifically, still referring to FIG. 8, two first time lengths are configured in each DRX cycle. In this case, if second indication information instructing a terminal to switch to a dormancy state is detected within the previous time length but is not detected in the later time length, then a DRX operation is determined according to the detection result of the previous time length where the second indication information is detected. In another case, if the indication information is detected in the later time length, then no matter whether the indication information is detected in the previous time length, the DRX operation is determined according to the detection result of the later time length.

Additionally, in an example of this embodiment, the indication information further includes length indication information of the on duration, and the DRX wake up state operation of the on duration further includes a length indication strategy of the on duration. In this case, in addition to indicating the state to which the terminal is to switch, the indication information may further indicate the length of the on duration. The WUS/WUP or the L1 signal and/or channel having a function of indicating a wake up indicates a wake up time length or a wake up timer threshold. In this case, the time length of the wake up state may be determined according to the wake up time length indicated by the WUS/WUP or the L1 signal and/or the L1 channel having the function of indicating a wake up, or according to expiring of a wake up timer indicated by the WUS/WUP or the L1 signal and/or the L1 channel having the function of indicating a wake up. As an implementation, the terminal restarts the wake up timer after successfully detecting a dedicated PDCCH. That is, an activity timer previously configured is replaced with the wake up timer or the newly indicated wake up time length. Additionally, the WUS/WUP further indicates a band width part (BWP) switch/slot format indication (SFI) and other information.

It is to be noted that when the DRX operation is the DRX wake up operation of the on duration, after the step of determining the detection result of the indication information within the first time length in the DRX cycle, the method further includes: determining, according to the detection result, whether the indication information is not received within the first time length; if the indication information is not received, setting the second time length as a missed detection compensation time length in the DRX cycle; and performing indication information detections again within the second time length.

In practical application, if the base station sends indication information within the first time length, but an ACK/NACK response feedback of the terminal is not received, or an ACK/NACK response feedback of a subsequent scheduled physical downlink shared channel (PDSCH) is not received, then the base station sends, at preset/configured cyclic positions in the DRX cycle of the terminal, again the indication information instructing the terminal to switch to the wake up state, so as to avoid ambiguous understanding between the terminal and the base station. Correspondingly, if the terminal does not receive the indication information within the first time length, then the terminal tries to receive the indication information again on a preset/configured cycle in the DRX cycle. Further, if the terminal detects the indication information within the first time length or detects the indication information again in the DRX cycle, it is not necessary to continue detecting the indication information in the DRX cycle.

In an example of this embodiment, after the step in which the indication information instructing the terminal to switch to the wake up state is detected within the second time length, the method further includes: if the indication information is detected within the second time length, adjusting a starting time of the on duration to a time when the indication information is detected within the second time length.

In the above embodiment, the DRX wake up state is optimized, so that when there are no traffic transmission requirements, the terminal does not need to wake up in each DRX cycle and perform PDCCH blind detections, thereby improving the dormancy effect of the terminal and ensuring the terminal to operate with low energy consumption.

Additionally, in this embodiment, when the DRX operation in is the DRX dormancy state operation of the off duration, the DRX dormancy state operation of the off duration includes at least one of the following: performing PDCCH detections in an off duration of the current DRX cycle or off durations of M DRX cycles after the current DRX cycle, or continuing maintaining the dormancy state in an off duration of the current DRX cycle or off durations of M DRX cycles after the current DRX cycle, where M is an integer greater than or equal to 1.

In an example of this embodiment, a detection result of indication information is determined within the first time length having a preset length and set in the off duration of the DRX cycle. The length of the first time length is configured through high layer signaling. The first time length is less than or equal to the time length of the off duration. The first indication information includes wake up state indication information. Moreover, when the detection result is that the first indication information is detected, it is determined that the DRX operation to be executed is performing the PDCCH detections in the off duration of the current DRX cycle or the off durations of the M DRX cycles after the current DRX; and when the detection result is that the first indication information is not detected, it is determined that the DRX operation to be executed is continuing maintaining the dormancy state in the off duration of the current DRX cycle or the off durations of the M DRX cycles after the current DRX cycle.

An implementation is independently configuring a WUS/WUP cycle of WUS/WUP detections in only a DRX off duration. In the off duration, once a WUS/WUP is detected at WUS/WUP cyclic times, the terminal continues performing PDCCH blind detections, and the performing time length may be a threshold of a DRX on duration timer. Optionally, the WUS/WUP cycle of the WUS/WUP detections in only the DRX off duration is independently configured. For example, the WUS/WUP cycle is configured as same as the DRX cycle and only at a starting position of the DRX off duration.

Another implementation is that in the DRX off duration, once L1 signaling having the wake up state indication information is detected at cyclic times of the L1 signaling, the terminal continues performing PDCCH blind detections, and the performing time length is the threshold of the DRX on duration timer.

In the above embodiment, the DRX dormancy state is optimized so that the terminal has a wake up opportunity in the DRX dormancy state, thus implementing a compromise between low latency-high reliability and dormancy.

Additionally, when the DRX operation is the operation of dynamically switching from the DRX wake up state to the DRX dormancy state, in some examples of this embodiment, a detection result of third indication information is determined within the first time length having a preset length and set in the on duration of the DRX cycle. The length of the first time length is configured by high layer signaling. The first time length is less than or equal to the time length of the on duration. The third indication information includes both dormancy state indication information and wake up state indication information. For example, the third indication information may be L1 signaling that has a bidirectional state switch indication function and may be used for indicating both a switch to the dormancy state and a switch to the wake up state. When the detection result is that the L1 signaling is detected, it is determined that the DRX operation to be executed is continuing maintaining the dormancy state in an on duration of the current DRX cycle or on durations of multiple DRX cycles after the current DRX cycle. In the on duration, once the L1 signaling indicating the switch to the dormancy state is detected at the cyclic times of the L1 signaling, the terminal enters the dormancy state or enters a deep dormancy state (the deep dormancy state is retaining only the ability to detect the L1 signaling). Additionally, the L1 signaling may indicate a switch to the dormancy state after a time interval of T. The value of T may be preset or one of multiple values configured for radio resource control (RRC).

In other examples of this embodiment, a detection result of fourth indication information within the first time length having a preset length and set in the on duration of the DRX cycle is determined. The first time length is less than or equal to the time length of the on duration. The fourth indication information includes adding wake up state indication information to physical downlink control information that schedules downlink control information (DCI) of unicast traffic. When the detection result is that the DCI is detected, it is determined that the DRX operation to be executed is continuing maintaining the dormancy state in an on duration of the current DRX cycle or on durations of multiple DRX cycles after the DRX cycle. The fourth indication information may indicate, by introducing 1 bit into the DCI that schedules the unicast traffic, that there is no need to receive and detect subsequent PDCCHs. In this case, in the DRX on duration, once it is detected that there is no need to receive and detect the subsequent PDCCHs, which is indicated by the 1 bit in the DCI that schedules the unicast traffic, a switch is performed from the on duration to the off duration.

In the above embodiment, the optimization of dynamic switching from the DRX wake up state to the DRX dormancy state is supported, so that the terminal can switch to the DRX dormancy state by merely receiving and detecting the L1 signaling, thus implementing dormancy more flexibly.

Additionally, it is further to be noted that when both the DRX and the indication information, such as a wake up signal and/or a wake up channel (WUS/WUP), indicating a switch to the wake up state are configured, a priority rule includes at least one of the modes described below.

Mode 1: In the case where both the wake up signal (WUS) and the DRX are configured: if a BWP where the WUS is located cannot support PDCCH transmission, then when the WUS has a higher priority, the DRX enters the dormancy state and still allows a wake up through the WUS; and when the DRX has a higher priority, the BWP where a WUS monitoring period is located cannot support PDCCH transmission, the DRX cannot be woken up and performed in cycles, or a switch to a default BWP is performed for DRX wake up state PDCCH detections, and in the DRX dormancy state, the terminal cannot wake up through the WUS. If the BWP where the WUS is located may support PDCCH transmission, then when the WUS has a higher priority, the DRX enters the dormancy state and still allows a wake up by the WUS; and when the DRX has a higher priority, during the WUS detection period in which the WUS is not detected, PDCCH detections may still be woken up and performed in a period of the DRX wake up state, and the terminal cannot be woken up through the WUS in a period of the DRX dormancy state.

Mode 2: In the case where both the wake up channel (WUP) and the DRX are configured: when the WUP has a higher priority, the DRX enters the dormancy state and still allows a wake up through the WUP; and when the DRX has a higher priority, in a WUP detection period without detecting the WUP, a DRX wake up may still be performed to detect PDCCHs, and the terminal cannot be woken up through the WUP in a period of the DRX dormancy state.

Mode 3: In the case where both the WUS/WUP and the DRX are configured: if a BWP where the WUS is located cannot support PDCCH transmission, then when the WUS/WUP has a higher priority, the DRX enters the dormancy state and still allows a wake up through the WUS/WUP; and when the DRX has a higher priority, during a WUP detection period in which the WUP is not detected, a DRX wake up may still be performed to detect PDCCHs, the terminal cannot be woken up through the WUP in a period of the DRX dormancy state, a BWP where a WUS monitoring period is located cannot support PDCCH transmission, and the DRX cannot be woken up and performed in cycles, or a switch to a default BWP is performed for DRX wake up state PDCCH detections, and the terminal cannot be woken up through the WUS in the period of the DRX dormancy state. If the BWP where the WUS is located may support PDCCH transmission, then when the WUS/WUP has a higher priority, the DRX enters the dormancy state and still allows a wake up through the WUS/WUP; and when the DRX has a higher priority, during the WUS/WUP detection period in which the WUS/WUP is not detected, the terminal may be woken up and perform PDCCH detections in a period of the DRX wake up state, and the terminal cannot be woken up through the WUS during the period of the DRX dormancy state.

The priorities of different dormancy mechanisms are determined to avoid ambiguous understanding between the terminal and the base station, thereby ensuring the coexistence of different dormancy mechanisms.

According to the reception configuration method in this embodiment of the present disclosure, a detection of indication information within a first time length in a DRX cycle is determined, where the DRX cycle includes an on duration and an off duration; a DRX operation to be executed is determined according to the detection result; and DRX configuration is performed according to the DRX operation. In the case of introducing the indication information, DRX is configured by detecting the indication information, thereby optimizing the DRX performance.

Second Embodiment

Figure 9:
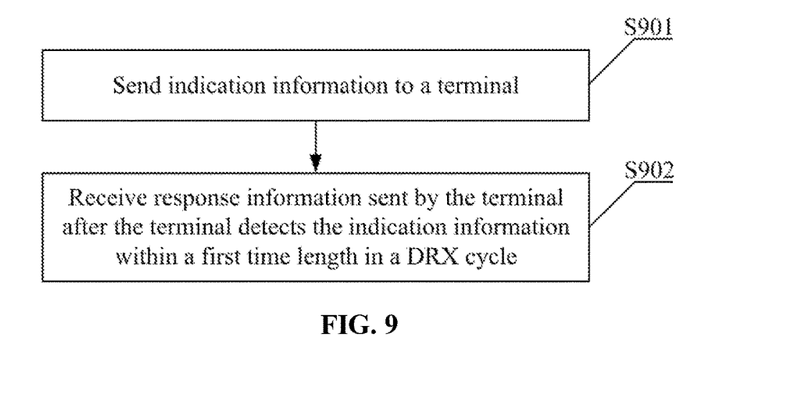
FIG. 9 is a flowchart of a reception control method according to a second embodiment of the present application.

This embodiment provides a reception control method. Referring to FIG. 9, it shows a flowchart of a reception control method.

In step S901, indication information is sent to a terminal, where sending situation of the indication information is used for instructing the terminal to determine a DRX operation.

In step S902, response information sent by the terminal after the terminal detects the indication information within a first time length in a DRX cycle is received, where the DRX cycle includes an on duration and an off duration.

In some examples of this application, a base station sends the indication information to the terminal. A wake up signal and/or a wake up channel (PDCCH) (WUS/WUP) may be used to indicate a switch to a wake up state. L1 signaling includes an L1 signal and/or channel and has at least the function of indicating a switch to a dormancy state (go to sleep). After the terminal receives the indication information within the first time length set in the DRX cycle, the corresponding DRX operation is determined according to the indication information, and then, the terminal returns the corresponding response information to the base station. At this time, the base station makes a corresponding PDCCH transmission strategy and decides whether or when to send, in the on duration of the terminal, a PDCCH that schedules unicast traffic of the terminal.

Further, after the step of sending the indication information to the terminal, the method further includes: if the response information from the terminal is not received, continuing sending indication information to the terminal within a second time length in the DRX cycle of the terminal.

In some examples of this application, if the base station sends the indication information within the first time length, but an ACK/NACK response feedback of the terminal is not received, or an ACK/NACK response feedback of a subsequently scheduled physical downlink shared channel (PDSCH) is not received, then the base station sends, at preset/configured cyclic positions in the DRX cycle of the terminal, a WUS/WUP again to avoid ambiguous understanding between the terminal and the base station. Correspondingly, if the terminal does not receive the indication information within the first time length, the terminal tries to receive the indication information again on a preset/configured cycle in the DRX cycle.

According to the reception control method in this embodiment of the present disclosure, in the case of introducing the indication information, the base station sends the indication information to the terminal to control the terminal to configure DRX according to the indication information, and the DRX wake up state of the terminal is optimized, so that when there are no traffic transmission requirements, the terminal does not need to wake up in each DRX cycle and perform PDCCH blind detections, thereby improving the dormancy effect of the terminal and ensuring the terminal to operate with low energy consumption.

Third Embodiment

Figure 10:
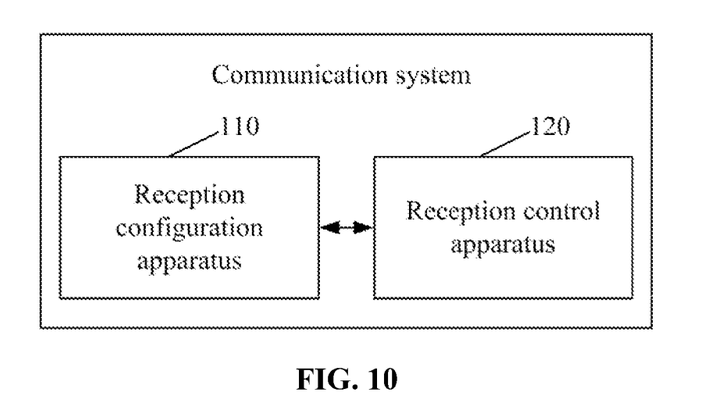
FIG. 10 is a structure diagram of a communication system according to a third embodiment of the present application.

FIG. 10 is a structure diagram of a communication system according to this embodiment. The communication system includes a reception configuration apparatus 110 and a reception control apparatus 120. The reception configuration apparatus 110 and the reception control apparatus 120 are used for indication information interaction and PDCCH scheduling and detections.

Figure 11:
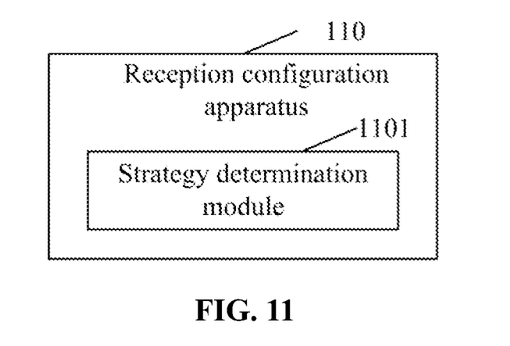
FIG. 11 is a structure diagram of a reception configuration apparatus according to the third embodiment of the present application.

Referring to FIG. 11, FIG. 11 is a structure diagram of a reception configuration apparatus 110 according to this embodiment. The reception configuration apparatus 110 is applied to a terminal and includes a strategy determination module 1101. The strategy determination module 110 is configured to determine a detection result of indication information within a first time length in a DRX cycle, and determine the DRX operation according to the detection result. The DRX cycle includes an on duration and an off duration.

In this embodiment, the indication information includes a state switch channel or a state switch signal. When the state switch channel or the state switch signal is a unidirectional state switch channel or a unidirectional state switch signal, where one form may be a wake up signal and/or a wake up channel (PDCCH) (WUS/WUP), the state switch channel or the state switch signal may be used for indicating a switch to a wake up state. When the state switch channel or the state switch signal is a unidirectional/bidirectional state switch channel or a unidirectional/bidirectional state switch signal, where one form may be L1 signaling including an L1 signal and/or an L1 channel, the state switch channel or the state switch signal has at least the function of indicating a switch to a dormancy state (go to sleep). In this embodiment, the DRX cycle is composed of the on duration and the off duration. It is to be noted that in this embodiment, the first time length is a detection time length of the indication information. The first time length may be selectively set in any one of the on duration or the off duration of the DRX cycle, or may be set in both the on duration and the off duration. Additionally, it is to be understood that in this embodiment, the detection result of the indication information is used for indicating whether the terminal receives the indication information.

In some examples of this embodiment, the DRX operation includes at least one of: a DRX wake up state operation of the on duration, a DRX dormancy state operation of the off duration, or an operation of dynamically switching from a DRX wake up state to a DRX dormancy state.

In this embodiment, when the DRX operation in is the DRX wake up state operation of the on duration, the DRX wake up state operation of the on duration includes: performing PDCCH detections in an on duration of the current DRX cycle or on durations of N DRX cycles after the current DRX cycle, and/or continuing maintaining the dormancy state in an on duration of the current DRX cycle or on durations of N DRX cycles after the current DRX cycle, where N is an integer greater than or equal to 1.

In some examples of this embodiment, the first time length is set in the on duration of the DRX cycle. The length of the first time length is configured through high layer signaling. A starting time of the first time length is the same as a starting time of the DRX cycle. First indication information includes wake up state indication information used for indicating a switch to the wake up state, which may be a wake up signal and/or a wake up channel. Then, when the detection result is that the wake up signal and/or the wake up channel is detected, the strategy determination module 110 determines that the DRX operation to be executed is performing the PDCCH detections in the on duration of the current DRX cycle or the on durations of the N DRX cycles after the current DRX; and when the detection result is that the wake up signal and/or the wake up channel is not detected, the strategy determination module 1101 determines that the DRX operation to be executed is continuing maintaining the dormancy state in the on duration of the current DRX cycle or the on durations of the N DRX cycles after the current DRX cycles. As an example in this embodiment, a configuration cycle of the first indication information is the same as the DRX cycle. That is, a time interval between same reference times of every two T0s is the same as a time interval between same reference times of every two DRX cycles. Certainly, in some other implementations, the configuration cycle of the first indication information may be greater than or less than the DRX cycle, which may be flexibly set according to specific application scenarios.

Moreover, in this embodiment, when configuring T0, some parameters of the DRX configuration, such as a cycle and an offset, may be shared, and only some parameters need to be additionally configured.

It is further to be noted that in this embodiment, the first time length may include at least one of: a time length required for transmitting the first indication information, a time length required for switching from the dormancy state to the wake up state, or a response feedback time length of the first indication information.

Additionally, in some examples of this embodiment, when the DRX operation is the DRX wake up state operation of the on duration, the DRX wake up state operation of the on duration includes at least one of the following: maintaining the dormancy state in an on duration of subsequent at least one DRX cycle, or performing PDCCH detections in an on duration of subsequent at least one DRX cycle.

In some examples of this embodiment, the first time length is set in the off duration of the DRX cycle. The length of the first time length is configured through high layer signaling. The first time length is less than or equal to the time length of the off duration. The first indication information includes wake up state indication information used for instructing the terminal to switch to the wake up state, which may be, for example, a wake up signal and/or a wake up channel. Then, when the detection result is that the wake up signal and/or the wake up channel is detected, the strategy determination module 1101 determines that the DRX operation to be executed is performing the PDCCH detections in the on duration of the subsequent at least one DRX cycle; and when the detection result is that the wake up signal and/or the wake up channel is not detected, the strategy determination module 1101 determines that the DRX operation to be executed is continuing maintaining the dormancy state in the on duration of the subsequent at least one DRX cycle. It is to be noted that in this embodiment, the wake up signal and/or the wake up channel cycle may be configured independently of the DRX cycle. That is, T0 and the DRX cycle are two sets of configurations independent of each other.

In some examples of this embodiment, the first time length is set in the off duration of the DRX cycle. The first time length is less than or equal to the time length of the off duration. Second indication information includes dormancy state indication information used for instructing the terminal to switch to the dormancy state, which may be, for example, L1 signaling including an L1 signal and/or an L1 channel. Then, when the detection result is that the L1 signaling instructing the terminal to switch to the dormancy state is detected, the strategy determination module 1101 determines that the DRX operation to be executed is continuing maintaining the dormancy state in the on duration of the subsequent at least one DRX cycle; and when the detection result is that the L1 signaling is not detected, the strategy determination module 1101 determines that the DRX operation to be executed is performing the PDCCH detections in the on duration of the subsequent at least one DRX cycle. It is to be noted that in an example of this embodiment, when a configuration cycle of the indication information including the dormancy state indication information is less than the DRX cycle, after determining detection results of indication information within multiple first time lengths set in the DRX cycle, the strategy determination module 1101 determines, according to the last detection result, the DRX operation to be executed.

Additionally, further, the indication information further includes length indication information of the on duration, and the DRX wake up state operation of the on duration further includes a length indication strategy of the on duration. In this case, in addition to indicating the state to which the terminal is to switch, the indication information may further indicate the length of the on duration. The WUS/WUP or the L1 signal and/or the L1 channel having a function of indicating a wake up indicates a wake up time length or a wake up timer threshold. In this case, the time length of the wake up state may be determined according to the wake up time length indicated by the WUS/WUP or the L1 signal and/or the L1 channel having the function of indicating a wake up, or according to expiring of a wake up timer indicated by the WUS/WUP or the L1 signal and/or the L1 channel having the function of indicating a wake up. As an implementation, the terminal restarts the wake up timer after successfully detecting a dedicated PDCCH. That is, an activity timer previously configured is replaced with the wake up timer or the newly indicated wake up time length. Additionally, the WUS/WUP further indicates a BWP switch/SFI and other information.

It is to be noted that in some examples of this embodiment, the apparatus further includes a missed detection compensation module. The missed detection compensation module is configured to determine whether the indication information is not received within the first time length according to the detection result; if the indication information is not received, set a second time length as a missed detection compensation time length in the DRX cycle; and perform indication information detection again within the second time length. Further, the apparatus further includes an on-duration adjustment module. The on-duration adjustment module is configured to adjust, when the indication information is detected within the second time length, a starting time of the on duration to a time when the indication information is detected within the second time length.

In the above embodiment, the DRX wake up state is optimized, so that when there are no traffic transmission requirements, the terminal does not need to wake up in each DRX cycle and perform PDCCH blind detections, thereby improving the dormancy effect of the terminal and ensuring the terminal to operate with low energy consumption.

Additionally, in this embodiment, when the DRX operation in is the DRX dormancy state operation of the off duration, the DRX dormancy state operation of the off duration includes at least one of the following: performing PDCCH detections in an off duration of the current DRX cycle or off durations of M DRX cycles after the current DRX cycle, and/or continuing maintaining the dormancy state in an off duration of the current DRX cycle or off durations of M DRX cycles after the current DRX cycle, where M is an integer greater than or equal to 1.

In an example of this embodiment, the strategy determination module 1101 determines a detection result of indication information within the first time length having a preset length and set in the off duration of the DRX cycle. The length of the first time length is configured through high layer signaling. The first time length is less than or equal to the time length of the off duration. The first indication information includes the wake up state indication information. Moreover, when the detection result is that the first indication information is detected, the strategy determination module 1101 determines that the DRX operation to be executed is performing the PDCCH detections in the off duration of the current DRX cycle or the off durations of the M DRX cycles after the current DRX; and when the detection result is that the first indication information is not detected, the strategy determination module 1101 determines that the DRX operation to be executed is to continuing maintaining the dormancy state in the off duration in the current DRX cycle or the off durations of the M DRX cycles after the current DRX cycle.

In the above embodiment, the DRX dormancy state is optimized so that the terminal has a wake up opportunity in the DRX dormancy state, thereby implementing a compromise between low latency-high reliability and dormancy.

Additionally, in some examples of this embodiment, the strategy determination module 1101 determines a detection result of indication information within the first time length having a preset length and set in the on duration of the DRX cycle. The length of the first time length is configured by high layer signaling. The first time length is less than or equal to the time length of the on duration. Third indication information includes both dormancy state indication information and wake up state indication information. For example, the third indication information may be L1 signaling that has a bidirectional state switch indication function and may be used for indicating both a switch to the dormancy state and a switch to the wake up state. When the detection result is that the L1 signaling is detected, the strategy determination module 1101 determines that the DRX operation to be executed is continuing maintaining the dormancy state in an on duration of the current DRX cycle or on durations of multiple DRX cycles after the current DRX cycle.

Further, in other examples of this embodiment, when the DRX operation is the DRX operation for dynamically switching from the DRX wake up state to the DRX dormancy state, the strategy determination module 1101 determines a detection result of indication information within the first time length having a preset length and set in the on duration of the DRX cycle. The first time length is less than or equal to the time length of the on duration. Fourth indication information includes adding wake up state indication information to physical downlink control information that schedules downlink control information (DCI) of unicast traffic. When the detection result is that the DCI is detected, the strategy determination module 1101 determines that the DRX operation to be executed is continuing maintaining the dormancy state in an on duration of the current DRX cycle or on durations of multiple DRX cycles after the DRX cycle.

In the above embodiment, the optimization of dynamic switching from the DRX wake up state to the DRX dormancy state is supported so that the terminal can switch to the DRX dormancy state by merely receiving and detecting the L1 signaling, thereby implementing dormancy more flexibly.

Figure 12:
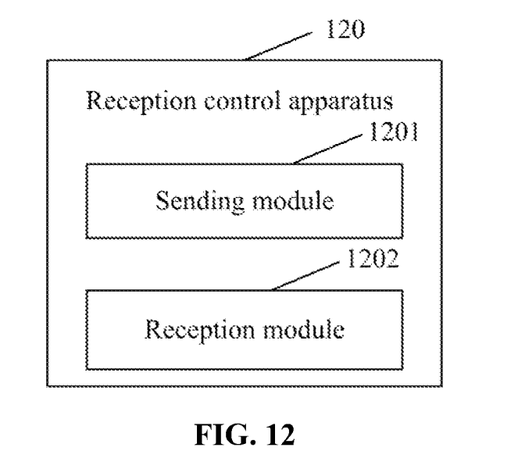
FIG. 12 is a structure diagram of a reception control apparatus according to the third embodiment of the present application.

Referring to FIG. 12, FIG. 12 is a structure diagram of a reception control apparatus 120 according to this embodiment. The reception control apparatus 120 is applied to a base station and includes a sending module 1201 and a reception module 1202.

The sending module 1201 is configured to send indication information to a terminal, where sending situation of the indication information is used for instructing the terminal to determine a DRX operation.

The reception module 1202 is configured to receive response information sent by the terminal after the terminal detects the indication information within a first time length in a DRX cycle. The DRX cycle includes an on duration and an off duration.

In some examples of this application, the sending module 1201 sends the indication information to the terminal. A wake up signal and/or a wake up channel (PDCCH) (WUS/WUP) may be used for indicating a switch to a wake up state. L1 signaling includes an L1 signal and/or an L1 channel and has at least the function of indicating a switch to a dormancy state (go to sleep). After the terminal receives the indication information within the first time length set in the DRX cycle, the corresponding DRX operation is determined according to the indication information, and then, the terminal returns the corresponding response information to the reception module 1202. At this time, the base station makes the corresponding PDCCH transmission strategy and decides whether or when to send, in the on duration of the terminal, a PDCCH that schedules unicast traffic of the terminal.

In some examples of this embodiment, after sending the indication information to the terminal, the sending module 1201 is further configured to, if the response information from the terminal is not received, continue sending indication information to the terminal within a second time length in the DRX cycle of the terminal.

In a communication system according to this embodiment of the present disclosure, the base station sends indication information to the terminal, and after detecting the indication information within the first time length in the DRX cycle, the terminal determines the DRX operation to be executed and performs DRX configuration according to the detection result; and when the base station receives response information fed back by the terminal according to the DRX operation, the base station determines a PDCCH sending strategy according to the response information. The DRX wake up state is optimized, so that when there are no traffic transmission requirements, the terminal does not need to wake up in each DRX cycle and perform PDCCH blind detections, thereby improving the dormancy effect of the terminal and ensuring that the terminal to operate with low energy consumption.

Fourth Embodiment

Figure 13:
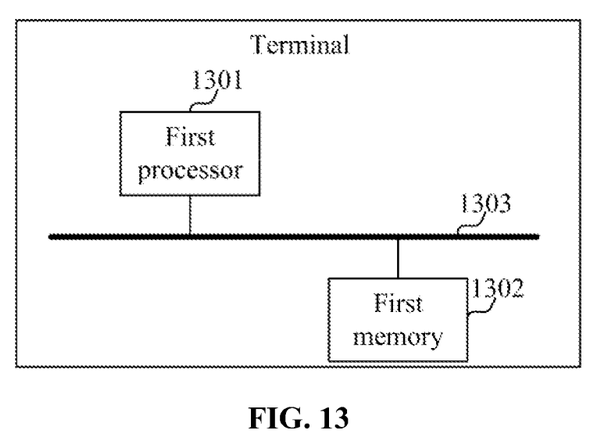
FIG. 13 is a structure diagram of a terminal according to a fourth embodiment of the present application.

Referring to FIG. 13, FIG. 13 is a structure diagram of a terminal according to this embodiment. The terminal includes a first processor 1301, a first memory 1302 and a first communication bus 1303. The first communication bus 1303 is configured to implement connection and communication between the first processor 1301 and the first memory 1302. The first processor 1301 is configured to execute one or more computer programs stored in the first memory 1302, so as to perform the processes of the reception configuration methods of the various embodiments of the present disclosure, which are not repeated here.

Figure 14:
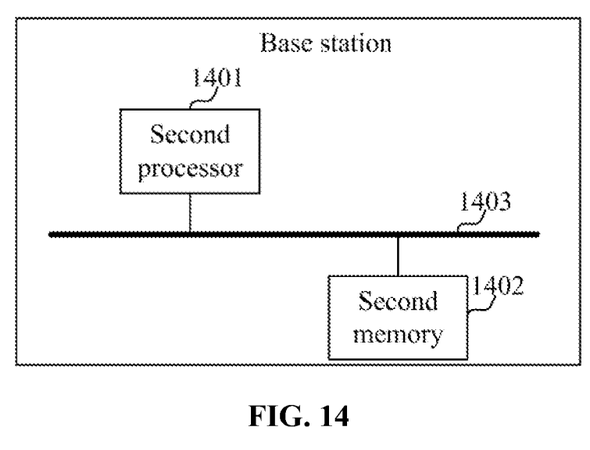
FIG. 14 is a structure diagram of a base station according to the fourth embodiment of the present application.

Referring to FIG. 14, FIG. 14 is a structure diagram of a terminal according to this embodiment. The terminal includes a second processor 1401, a second memory 1402 and a second communication bus 1403. The second communication bus 1403 is configured to implement connection and communication between the second processor 1401 and the second memory 1402. The second processor 1401 is configured to execute one or more computer programs stored in the second memory 1402, so as to perform the processes of the reception control methods of the various embodiments of the present disclosure, which are not repeated here.

Fifth Embodiment

This embodiment provides a computer-readable storage medium. The computer-readable storage medium stores one or more computer programs executable by one or more processors to perform the reception configuration methods of the various embodiments above, or the reception control methods of the various embodiments above, which are not repeated here.

Apparently, it is to be understood by those of ordinary skill in the art that each of the modules or steps in the embodiments of the present disclosure above may be implemented by a general-purpose computing apparatus, the modules or steps may be concentrated on a single computing apparatus or distributed on a network composed of multiple computing apparatuses, and optionally, the modules or steps may be implemented by program codes executable by the computing apparatuses, so that the modules or steps may be stored in a computer storage medium (such as a read-only memory (ROM)/random access memory (RAM), a magnetic disk or an optical disk) and executed by the computing apparatuses. Moreover, in some cases, the illustrated or described steps may be executed in sequences different from those described herein, or the modules or steps are made into various integrated circuit modules separately, or multiple modules or steps therein are made into a single integrated circuit module for implementation. Therefore, the present application is not limited to any particular combination of hardware and software.

The above is a more detailed description of the embodiments of the present disclosure in conjunction with specific implementations, and the specific implementations of the present application cannot be construed as being limited to the description. For those of ordinary skill in the art to which the present application pertains, several simple deductions or substitutions may be made without departing from the concept of the present application and should fall within the scope of the present application.

What is claimed is:

1. A reception configuration method, comprising:
   receiving, by a terminal, indication information from a base station;
   determining, by the terminal, a detection result of the indication information in a discontinuous reception (DRX) cycle, wherein the indication information is in a downlink control information (DCI) format, and one bit in the DCI format indicates a switch to a wake up state or a switch to a dormancy state; and
   determining, by the terminal, a DRX operation according to the detection result,
   wherein the DRX operation comprises: maintaining a dormancy state in an on duration of a subsequent DRX cycle, or performing physical downlink control channel (PDCCH) detection in the on duration of the subsequent DRX cycle,
   wherein the wake up state represents that the PDCCH detection is performed in an on duration at the start of the DRX cycle, and wherein a cycle of the indication information and the DRX cycle are independently configured.

2. The method of claim 1, wherein the dormancy state represents that the PDCCH detection is not performed in the on duration at the start of the DRX cycle.

3. A terminal, comprising:
   at least one processor configured to:
   receive, via a receiver, indication information from a base station;
   determine, by the terminal, a detection result of the indication information in a discontinuous reception (DRX) cycle, wherein the indication information is in a downlink control information (DCI) format, and one bit in the DCI format indicates a switch to a wake up state or a switch to a dormancy state; and
   determine, by the terminal, a DRX operation according to the detection result, wherein the DRX operation comprises: maintaining a dormancy state in an on duration of a subsequent DRX cycle, or performing physical downlink control channel (PDCCH) detection in the on duration of the subsequent DRX cycle, wherein the wake up state represents that the PDCCH detection is performed in an on duration at the start of the DRX cycle, and wherein a cycle of the indication information and the DRX cycle are independently configured.

4. The terminal of claim 3, wherein the dormancy state represents that the PDCCH detection is not performed in the on duration at the start of the DRX cycle.

5. A reception control method, comprising:
sending, by a base station, indication information to a terminal to determine a detection result in a discontinuous reception (DRX) cycle DRX operation according to the detection result, wherein the indication information is in a downlink control information (DCI) format, and one bit in the DCI format indicates a switch to a wake up state or a switch to a dormancy state, wherein the DRX operation comprises: maintaining a dormancy state in an on duration of a subsequent DRX cycle, or performing physical downlink control channel (PDCCH) detection in the on duration of the subsequent DRX cycle, wherein the wake up state represents that the PDCCH detection is performed in an on duration at the start of the DRX cycle, and wherein a cycle of the indication information and the DRX cycle are independently configured.

6. The method of claim 5, wherein the dormancy state represents that the PDCCH detection is not performed in the on duration at the start of the DRX cycle.

7. A base station, comprising:
at least one processor and a transmitter configured to:
send indication information to a terminal to determine a detection result in a discontinuous reception (DRX) cycle DRX operation according to the detection result, wherein the indication information is in a downlink control information (DCI) format, and one bit in the DCI format indicates a switch to a wake up state or a switch to a dormancy state, wherein the DRX operation comprises: maintaining a dormancy state in an on duration of a subsequent DRX cycle, or performing physical downlink control channel (PDCCH) detection in the on duration of the subsequent DRX cycle, wherein the wake up state represents that the PDCCH detection is performed in an on duration at the start of the DRX cycle, and wherein a cycle of the indication information and the DRX cycle are independently configured.

8. The base station of claim 7, wherein the dormancy state represents that the PDCCH detection is not performed in the on duration at the start of the DRX cycle.

* * * * *